United States Patent Office 3,790,540
Patented Feb. 5, 1974

3,790,540
ELASTOMERIC FLUORINATED TERPOLYMER HAVING GOOD THERMAL STABILITY
Julius Eugene Dohany, Berwyn, and Alfred Case Whiton, Blue Bell, Pa., assignors to Pennwalt Corporation, Philadelphia, Pa.
No Drawing. Filed Aug. 23, 1971, Ser. No. 174,216
Int. Cl. C08f 15/40
U.S. Cl. 260—80.77                5 Claims

ABSTRACT OF THE DISCLOSURE

This invention relates to a novel and thermally stable terpolymer of vinylidene fluoride, hexafluoropropane and trifluoroethylene in respective quantities of about 29–55% by weight hexafluoropropene, 2–20% by weight trifluoroethylene and the remainder vinylidene fluoride which terpolymer forms amine-cured vulcanizates with excellent initial and heat-aged properties.

DISCLOSURE

This invention relates to new chemical compounds and more particularly to elastomeric fluorinated terpolymers formed by copolymerizing vinylidene fluoride, hexafluoropropene and trifluoroethylene.

PRIOR ART

In order to meet the demand for elastomeric polymers which possess a high degree of thermal and chemical stability as well as resistance to various solvents, a number of fluorinated polymeric products have been developed. Among such products which have achieved a high degree of commercial success are the copolymers of vinylidene fluoride and hexafluoropropane, which are described in U.S. Pat. 3,051,677, and the terpolymers of vinylidene fluoride, hexafluoropropane and tetrafluoroethylene which are described in U.S. Pat. 2,968,649. Although the copolymer of vinylidene fluoride and hexafluoropropene possesses high thermal and chemical stability, better high temperature properties are claimed for the terpolymer of vinylidene fluoride, hexafluoropropene and tetrafluoroethylene, supporting the generally held theory that thermal stability of fluoro polymers decreases as the hydrogen content increases.

STATEMENT OF THE INVENTION

In accordance with the present invention a novel elastomeric terpolymer containing 29–55% by weight hexafluoropropene, 2–20% trifluoroethylene and the remainder vinylidene fluoride is provided, which terpolymer (1) has good thermal stability as a gum stock and (2) forms amine-cured vulcanizates having excellent initial and heat-aged properties. Preferably the terpolymer of the present invention contains from about 2 to about 12% by weight trifluoroethylene and from about 40% to about 50% of the other two components. A terpolymer containing from 2 to 5% by weight trifluoroethylene and 95 to 98% by weight vinylidene fluoride and hexafluoropropene in proportion between 1:2 and 2:1 is particularly desirable. The gum stock of the defined class of terpolymer is conveniently prepared by a conventional free-radical initiated polymerization of monomers substantially in that proportion in which the component units are desired as constituents of the final polymer, the presence of trifluoroethylene unexpectedly promoting the polymerization of hexafluoropropene, which does not normally polymerize as readily as vinylidene fluoride. The terpolymer gum stock is readily vulcanized using polyfunctional amines to produce vulcanizates possessing unusually good heat-aging properties when compared against other closely related vulcanized fluoro rubbers containing a lesser ratio of hydrogen as is demonstrated hereinafter.

EXAMPLES

The invention will be more readily understood by reference to the examples which are cited to illustrate the invention. They are not intended to limit it in any manner. The heat aging reported in the examples is conducted at 600° F. for 16 hours. All properties are measured at room temperature.

Example 1

A two gallon horizontal stainless steel autoclave equipped with a paddle agitator, heating-cooling jacket, thermocouple and manometer is charged with 5400 parts deionized water containing 2.7 parts of ammonium salt of perfluoro (8-methyloctanoic) acid, 5.4 parts of trisodium phosphate dodecahydrate, 10.8 parts of ammonium persulfate and 2.7 parts of sodium bisulfite. The closed polymerizer is evacuated five minutes to remove air from the reactor, nitrogen is then fed in until atmospheric pressure is reached following which 30 parts acetone is introduced.

After the agitator is turned on, the reactor is gradually pressurized with a mixture of 47.9 wt. percent vinylidene fluoride (VDF), 18.7 wt. percent trifluoroethylene (VF$_3$) and 33.3 wt. percent hexafluoropropene (HFP) to 400 p.s.i.g. and heated to 70° C. Pressure is maintained by continuous supply of the feed mixture; over a ¾ hour reaction period 1500 parts of the monomer mixture is used. After monomer feed is turned off, the reactor cooled, vented to the atmosphere and discharged, the latex is coagulated by the addition of small amount of a 10% solution of calcium chloride. The coagulated crumb is washed thoroughly with water and dried in an oven at 70° C. providing 1263 parts of dry terpolymer. From an analysis of the vented-off gas (31.8/56.5/10.0 weight percent of VDF/HFP/VF$_3$ respectively), the terpolymer gum stock is calculated to consist of 50.8/28.9/20.3 wt. percent of VDF/HFP/VF$_3$ respectively.

100 parts of the terpolymer gumstock is compounded on a water cooled, two roll mill with 15 parts magnesium oxide, 20 parts of medium thermal carbon black (MT), and 3 parts of N,N'-bis-cinnamylidenehexamethylenediamine. The compounded elastomeric gum stock is molded at 335° F. for 30 minutes at 5000 p.s.i.g., removed from the mold and placed in an oven and step cured from 100 to 208° C. for a total of 24 hours. Properties of the vulcanizate before and after aging are reported in Table I.

COMPARATIVE CONTROL A

A comparative control sample is prepared wherein the VF$_3$ is replaced by tetrafluoroethylene (TFE) to produce a terpolymer within the claims of U.S. Pat. 2,968,649. The polymerization process described in Example 1 is repeated except that 2400 parts of termonomer mixture containing 45.3/35.0/19.7 wt. percent of VDF/HFP/TFE respectively is fed into the reactor over a period of 73 minutes, producing 2133 parts of terpolymer of 47.5/32.5/20.0 wt. percent VDF/HFP/TFE respectively (calculated from a residual gas mixture of 27.0/53.1/14.4 wt. percent of the same respective units).

Properties of the vulcanizates of Examples 1, 2 and Control A, before and after heat aging, are reported in Table I.

TABLE I

| Sample | Before | | | After | | |
|---|---|---|---|---|---|---|
| | Modulus at 100% elong., p.s.i. | Tensile strength (break), p.s.i. | Elongation (break), percent | Percent retained of orig. modulus | Percent retained of orig. tensile | Percent retained of orig. elong. |
| Example 1 | 781 | 3,179 | 320 | Inf | 68.4 | 28.7 |
| Example 2 | 653 | 2,693 | 357 | 90 | 28.1 | 54.6 |
| Control A | 544 | 2,074 | 323 | 94 | 24 | 40 |

From the above it will be obvious that the vulcanizate of Example 1 has somewhat better properties than Control A prior to heat aging and comparable properties after such aging whereas the Example 2 (39.6/41.0/19.4 weight percent of VDF/HFP/VF$_3$ respectively, a preferred embodiment, and prepared as described below) presents a marked improvement over the control. Examples 1 and 2 differ significantly only in their relative proportions of VDF and HFP while each of Examples 1 and 2 as well as Control A have essentially the same amount of a third component.

Example 2

The polymerization technique and procedure of Example 1 is followed except a feed composition of 33.4/50.0/16.6 weight percent VDF/HFP/VF$_2$ respectively is added over a reaction period of 90 minutes at 350 p.s.i.g. to yield 1146 grams of terpolymer gumstock. The product composition is 39.6/41.0/19.4 weight percent of VDF/HFP/VF$_3$ respectively (calculated from a residual gas analysis of 12.0/78.4/6.8 weight percent of the same components respectively).

COMPARATIVE CONTROL B

A control sample (within the claimed subject matter of U.S. 3,051,677) is produced comparative to the vulcanizate of Example 2 wherein VDF is increased to completely replace VF$_3$. In this polymerization the autoclave is given an initial charge as described in Example 1 except that acetone is reduced to 15.8 parts. A gas feed (2400 parts) of 60/40 weight percent of VDF/HFP respectively is reacted under the conditions of Example 1 for 120 minutes yielding 2164 parts of gumstock of 61.8/38.2 weight percent of VDF/HFP respectively (calculated from a residual gas analysis of 38.9/55.7 weight percent of the same respective components). Properties of the vulcanizates of Example 2 (with VF$_3$) and Control B (without VF$_3$) before and after heat aging are reported in Table II.

TABLE II

| Sample | Before | | | After | | |
|---|---|---|---|---|---|---|
| | Modulus at 100% elong., p.s.i. | Tensile strength (break), p.s.i. | Elongation (break), percent | Percent retained of orig. modulus | Percent retained of orig. tensile | Percent retained of orig. elong. |
| Example 2 | 653 | 2,693 | 357 | 90 | 28.1 | 54.6 |
| Control B | 798 | 2,373 | 288 | Inf | 59 | 3.5 |

While initial properties of the vulcanizates are reasonably comparable, Example 2 shows significant improvement on heat-aging over Control B in the matter of retained modulus and retained elongation.

Examples 3–8

These examples, 3–8 inclusive, illustrate preferred terpolymer compositions of the present invention containing a relatively low percentage of VF$_3$. Table III presents the gumstock composition of the various examples and Table IV recites observed properties before and after heat aging of the various vulcanizates.

TABLE III

| Example | Gumstock composition | | |
|---|---|---|---|
| | VDF, wt. percent | HFP, wt. percent | VF$_3$ wt. percent |
| 3 | 50.2 | 41.7 | 8.1 |
| 4 | 50.4 | 46.5 | 3.1 |
| 5 | 50.6 | 46.9 | 2.5 |
| 6 | 50.1 | 47.5 | 2.4 |
| 7 | 49.4 | 48.5 | 2.1 |
| 8 | 42.2 | 54.2 | 3.6 |

TABLE IV

| Example | Before | | | After | | |
|---|---|---|---|---|---|---|
| | Modulus at 100% elong., p.s.i. | Tensile strength (break), p.s.i. | Elongation (break), percent | Percent retained of orig. modulus | Percent retained of orig. tensile | Percent retained of orig. elong. |
| 3 | 278 | 1,958 | 490 | 187 | 40.1 | 21.6 |
| 4 | 611 | 1,825 | 262 | 95 | 73 | 83 |
| 5 | 672 | 2,268 | 312 | 138 | 68 | 55 |
| 6 | 575 | 1,922 | 318 | 121 | 60 | 65 |
| 7 | 645 | 1,815 | 252 | 135 | 71 | 60 |
| 8 | 537 | 2,089 | 340 | 181 | 55.5 | 53.5 |

Reaction conditions and monomer feed compositions employed in Examples 3-8 is reported in Table V. Except as noted the equipment and conditions of Example I are employed.

TABLE V

| Example | 3 [a] | 4 | 5 | 6 | 7 | 8 |
|---|---|---|---|---|---|---|
| VDF (wt. percent) | 51.8 | 46.9 | 47.6 | 47.7 | 48 | 46.7 |
| HFP (wt. percent) | 40.0 | 50.2 | 50 | 50 | 50 | 50 |
| VF$_3$ (wt. percent) | 8.2 | 2.9 | 2.4 | 2.3 | 2 | 3.3 |
| Acetone (ml.) | 20 | 23.7 | [c] 0 | [d] 20 | [b] 40 | 15.8 |
| Reaction time (min.) | 80 | 165 | 90 | 120 | 90 | 115 |
| Monomer feed (g.) | 2,000 | 1,500 | 2,000 | 2,000 | 1,500 | 2,400 |
| Polymer yield (g.) | 1,832 | 1,144 | 1,740 | 1,792 | 1,775 | 1,794 |

[a] Pressure of 350 p.s.i.g. employed.
[b] Metered into the reactor with and in proportion to monomer feed.
[c] 20 ml. of di-t-butyl-peroxide and 20 ml. of 1,1,2-trichlorotrifluoroethane included in initial charge as chain transfer agents.
[d] 20 ml. of di-t-butyl-peroxide also included in original reactor charge as additional chain transfer agent.

POLYMERIZATION CONDITIONS

The terpolymer of the present invention is made using the conventional free-radical initiated system. As exemplified above, it is convenient to feed the monomer gas mixture into a heated autoclave containing the usual liquid reaction medium, catalyst, chain transfer agent and the like. Specific materials for these purposes are well known in the art, e.g. U.S. 2,968,849 and 3,051,677. Such systems are conveniently operated at a pressure between about 100 and 1200 p.s.i.g., at a temperature of between about 65 to 150° C. and for a reaction period of from about 3 to about 180 minutes.

Generally, the terpolymerizates are obtained by polymerizing a monomer mixture in an aqueous recipe containing a free radical polymerization initiator, a surfactant and a buffer.

Free radical initiators known in the art are usable; however, the preferred initiators are water-soluble, inorganic, peroxy compounds. It should also be understood that polymerization accelerators, such as sodium bisulfite can also be used and buffering agents may also be included in the recipe to regulate the final pH of the reaction mixture.

Preferred surfactants which may be used for the aqueous polymerization are salts of perhalo acids which compounds have a general formula

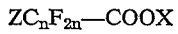

$$ZC_nF_{2n}—COOX$$

where Z is selected from the group consisting of fluorine and chlorine, where $n$ is an integer from 5 to 13 and where X is a cation. Such surfactants are shown in U.S. 2,559,752 and of those, the preferred are the ammonium salts of perfluoro octanoic acid. Another preferred surfactant is the ammonium salt of perfluoro (8-methyloctanoic) acid disclosed in U.S. 3,311,556, Example 3.

The resulting terpolymers are high molecular weight and within normal limits, the molecular weight of the terpolymer can be regulated by use of suitable chain transferring agents incluuded in the recipe such as acetone, methanol, tertiary butyl alcohol, chloroform. The amount of these agents depends upon the desired molecular weight and the effectiveness of the particular agent used.

While aqueous solutions have been described as preferred, it is clear that the terpolymers can also be made in suspension by, for example, polymerizing vinylidene fluoride, trifluoroethylene and hexafluoropropene in a recipe comprising water, an inert organic solvent such as 1,1,2-trichloro trifluoroethane, a water soluble protective colloid such as Methocel 65 HG and an initiator such as diisopropylperoxydicarbonate (an example of this process is shown in U.S. 3,437,648).

Following polymerization, the product is coagulated by known methods, washed and dried.

VULCANIZATION

The gumstock prepared in the polymerization may be vulcanized by a variety of methods including, as illustrated, the use of a diamine curing agent such as N,N'-bis - cinnamylidenehexamethylenediamine. Fillers, reinforcing agents, pigments and the like may also be added.

UTILITY

The gumstocks of the present invention are useful for making vulcanizates which may be employed in all situations where elastomers are used, particularly where thermal and chemical stability are desirable.

Many equivalent modifications of the present invention will be apparent to those skilled in the art from a reading of the above without a departure from the inventive concept.

What is claimed is:

1. A terpolymer consisting of 29 to 55% by weight of units of hexafluoropropene, 2 to 20% by weight of units of trifluoroethylene and the remainder units of vinylidene fluoride.

2. A terpolymer consisting of 2 to 12% by weight of units of trifluoroethylene and the remainder a mixture of units of hexafluoropropene and vinylidene fluoride in proportion that units of neither component of said mixture constitutes less than about 40% by weight of said terpolymer.

3. The terpolymer of claim 2 wherein trifluoromethylene units content is from 2 to 50% by weight.

4. The terpolymer of claim 3 wherein the proportion of units of hexafluoropropene:vinylidene fluoride is between 1:2 and 2:1.

5. The vulcanizate of the terpolymer of claim 1.

References Cited
UNITED STATES PATENTS

| 2,968,649 | 1/1961 | Pailthorp et al. | 260—80.5 |
| 3,023,187 | 2/1962 | Lo | 260—41 |
| 3,051,677 | 8/1962 | Rexford | 260—29.6 |

STANFORD M. LEVIN, Primary Examiner

U.S. Cl. X.R.
260—41 C, 87.7